United States Patent
Hill et al.

(10) Patent No.: US 11,636,428 B2
(45) Date of Patent: *Apr. 25, 2023

(54) SYSTEM FOR TRACKING RESOURCES WITH MULTIPLE USERS AND MULTIPLE LOCATIONS

(71) Applicant: BANK OF AMERICA CORPORATION, Charlotte, NC (US)

(72) Inventors: Christine Meloro Hill, Charlotte, NC (US); Manu Jacob Kurian, Dallas, TX (US); Lalit Dhawan, Franklin Park, NJ (US); Robert N. Gridley, Milton, GA (US); G. Alister Bazaz, Atlanta, GA (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/551,615

(22) Filed: Dec. 15, 2021

(65) Prior Publication Data

US 2022/0108265 A1  Apr. 7, 2022

Related U.S. Application Data

(63) Continuation of application No. 16/831,372, filed on Mar. 26, 2020, now Pat. No. 11,301,807.

(51) Int. Cl.
*G06Q 10/087* (2023.01)
*G06F 16/27* (2019.01)

(52) U.S. Cl.
CPC ......... *G06Q 10/087* (2013.01); *G06F 16/27* (2019.01)

(58) Field of Classification Search
CPC ............................. G06Q 10/087; G06F 16/27
USPC ......................................................... 705/28
See application file for complete search history.

(56) References Cited

U.S. PATENT DOCUMENTS

| | | | |
|---|---|---|---|
| 9,635,006 | B2 | 4/2017 | Oz et al. |
| 9,818,154 | B1 | 11/2017 | Wilbert et al. |
| 10,198,609 | B1 | 2/2019 | Tripathy et al. |
| 10,299,128 | B1 | 5/2019 | Suthar et al. |
| 10,332,124 | B2 | 6/2019 | Avary et al. |
| 10,332,208 | B1 | 6/2019 | Loo et al. |
| 10,402,793 | B2 | 9/2019 | Haldenby et al. |
| 10,438,037 | B1 | 10/2019 | Tripathy et al. |
| 2006/0143112 | A1 | 6/2006 | Donarski et al. |
| 2017/0046664 | A1 | 2/2017 | Haldenby et al. |

(Continued)

*Primary Examiner* — Garcia Ade
(74) *Attorney, Agent, or Firm* — Moore & Van Allen PLLC; Nicholas C. Russell

(57) ABSTRACT

The present disclosure is directed to a novel system for using a distributed register to conduct, manage, and store resource tracking data. In particular, computing systems may be used to perform assessments on and track various diagnostic parameters for a fleet of resources within an enterprise environment and store the data records within the distributed register. Data may be received in a periodic manner, event-based manner, or a continuous manner from on-board diagnostic components of the resources. The system may further comprise one or more distributed register interjectors which may trigger the addition of updated data records for one or more resources in the distributed register. In this way, the system provides for a highly efficient way to track and analyze resource data and forecast value and condition of resources belonging to the entity.

20 Claims, 6 Drawing Sheets

(56) References Cited

U.S. PATENT DOCUMENTS

| | | | |
|---|---|---|---|
| 2017/0228731 A1 | 8/2017 | Sheng et al. | |
| 2017/0236094 A1 | 8/2017 | Shah | |
| 2018/0012311 A1 | 1/2018 | Small et al. | |
| 2018/0018723 A1* | 1/2018 | Nagla | H04L 63/08 |
| 2018/0096175 A1 | 4/2018 | Schmeling et al. | |
| 2018/0129945 A1 | 5/2018 | Saxena et al. | |
| 2018/0165763 A1 | 6/2018 | Dolle et al. | |
| 2018/0337769 A1 | 11/2018 | Gleichauf | |
| 2019/0158275 A1 | 5/2019 | Beck | |
| 2019/0188706 A1 | 6/2019 | Mccurtis | |
| 2019/0220861 A1 | 7/2019 | Silver et al. | |
| 2019/0303463 A1 | 10/2019 | Catalano et al. | |
| 2019/0337769 A1 | 11/2019 | Khzouz et al. | |
| 2019/0378357 A1 | 12/2019 | Avary et al. | |
| 2020/0101367 A1* | 4/2020 | Tran | B33Y 10/00 |
| 2020/0155944 A1 | 5/2020 | Witchey et al. | |
| 2020/0213124 A1 | 7/2020 | Castinado | |
| 2020/0394731 A1 | 12/2020 | Branscomb et al. | |
| 2021/0112063 A1 | 4/2021 | Castinado et al. | |
| 2021/0133888 A1 | 5/2021 | Leise et al. | |
| 2021/0150514 A1 | 5/2021 | Schwartz | |
| 2021/0150622 A1 | 5/2021 | Schwartz | |
| 2021/0304119 A1 | 9/2021 | Hill et al. | |

* cited by examiner

SYSTEM FOR TRACKING RESOURCES WITH MULTIPLE USERS AND MULTIPLE LOCATIONS

CROSS-REFERENCE TO RELATED APPLICATION

The present application is a continuation application of and claims priority to U.S. patent application Ser. No. 16/831,372 filed Mar. 26, 2020 of the same title; the contents of which are also incorporated by reference herein.

FIELD OF THE INVENTION

The present disclosure embraces a system, computer program product, and computer-implemented method for a system for assessing, inventorying, monitoring, and managing systems of devices and inventory using a distributed register. In particular, the system may comprise a distributed register to automatically store, manage, and/or update system data for a fleet of vehicles, vehicle parts and components, or other machines.

BACKGROUND

Within an entity's network, manually performing assessments on systems and inventory (e.g., for vehicle financing, title, registration, maintenance, service history, or the like) within the enterprise environment may be a time-consuming, inaccurate, or duplicative process. Accordingly, there is a need for a more efficient and error-free way to conduct the inventory assessment process.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

The present disclosure is directed to a novel system for using a distributed ledger to conduct, manage, and store vehicle or fleet data. In particular, computing systems may be used to perform assessments, report assessment data, or receive real time data on the various components and systems within a vehicle fleet environment and store the data records within the distributed ledger. The entity system may further comprise one or more updating components which may trigger the addition of updated data records for one or more assessments in the distributed ledger. In this way, the system provides for a highly efficient way to assess, record, and monitor vehicle or fleet data.

Accordingly, embodiments of the present disclosure provide a system for managing resource tracking data in a distributed register, comprising: a processor; a communication interface; and a memory having a copy of the distributed register and executable code stored thereon, wherein the executable code, when executed by the processor, causes the processor to: receive resource tracking data from one or more entities or user devices; receive, from resource tracking system, a request to add a proposed data record to the distributed register, wherein the proposed data record comprises resource tracking data; validate, using a consensus algorithm, the proposed data record based on the resource tracking data; append the proposed data record to an entry in the distributed register; receive additional resource tracking data for the multiple resources; detect, via a distributed register interjector, that the resource tracking data requires an update; based on detecting that the resource tracking data requires the update, trigger the resource tracking system to submit resource tracking data; receive, from the resource tracking system, a second proposed data record, the second proposed data record comprising the additional resource tracking data; validate, using the consensus algorithm, the second proposed data record based on the additional resource tracking data; and append the second proposed data record to a new entry in the distributed register.

In some embodiments, the additional resource tracking data is received in a continuous stream.

In some embodiments, the resource tracking data and additional resource tracking data comprises diagnostic data produced by an on board diagnostic device.

In some embodiments, the system is further configured to receive policies, guidelines, and procedures; and analyze validated resource tracking data in order to determine if the resource tracking data indicates compliance with the policies guidelines, or procedures affecting one or more of the multiple resources.

In some embodiments, the system is further configured to analyze validated resource tracking information to determine a resource operation pattern for one or more of the multiple resources; extrapolate a resource value impact vector based on the determined resource operation pattern; determine a forecasted resource value for one or more timeframes based on the value impact vector; and generate and display via the user device an alert comprising the forecasted resource value.

In some embodiments, the distributed register interjector is a periodic interjector, wherein the periodic interjector causes the processor to: detect that a threshold amount of time has passed since resource tracking data has been received or detect that an triggering event has occurred based on validated data records; and trigger the resource tracking system to compile a report for validated data for one or more of the multiple resources.

In some embodiments, the distributed register interjector is a policy interjector, wherein the policy interjector causes the processor to: detect a change in a policy affecting one or more of the multiples resources; and trigger the resource tracking system to submit a third proposed data record, the third proposed data record comprising additional resource tracking data associated with the change in the policy.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
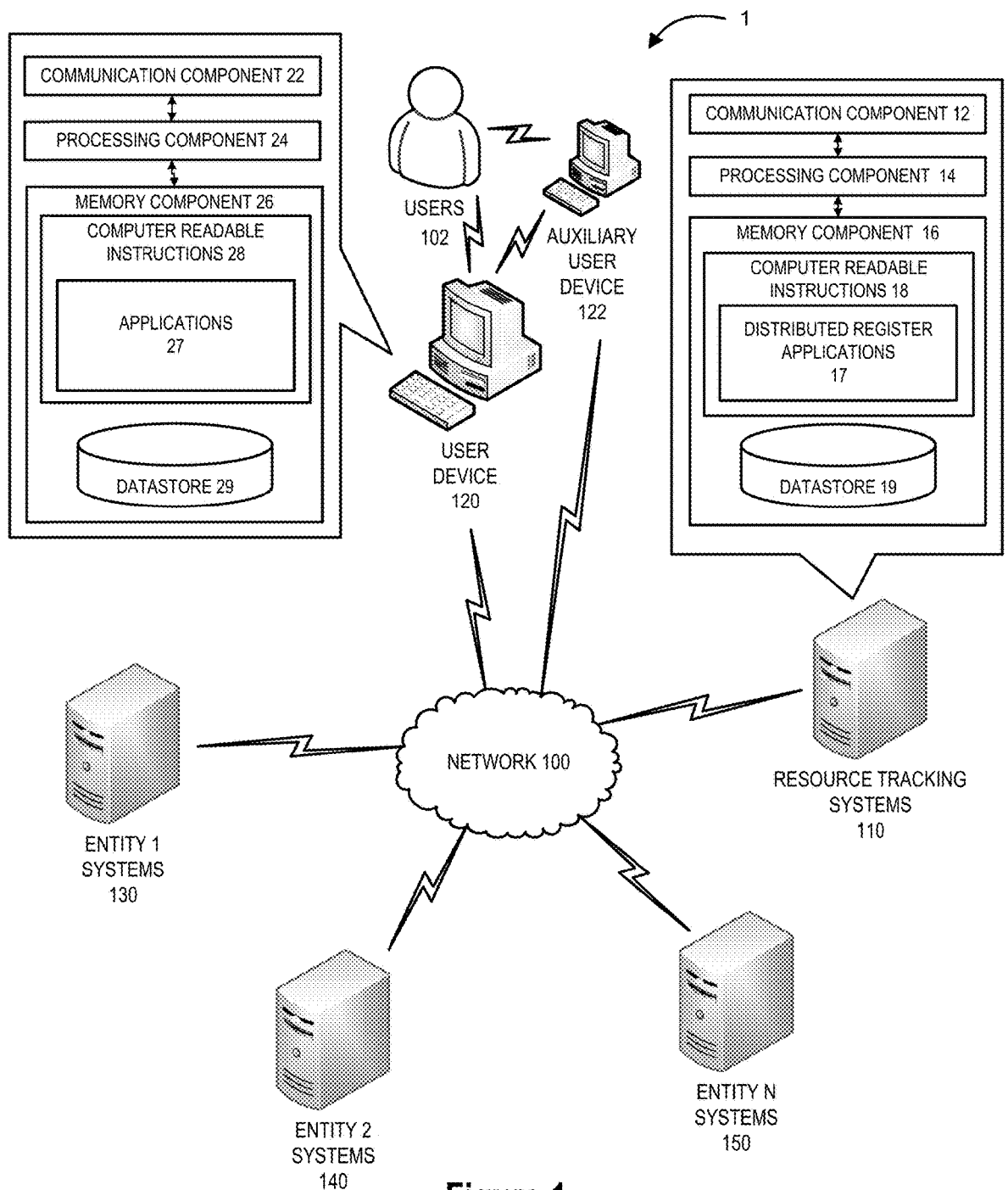
Figure 2:
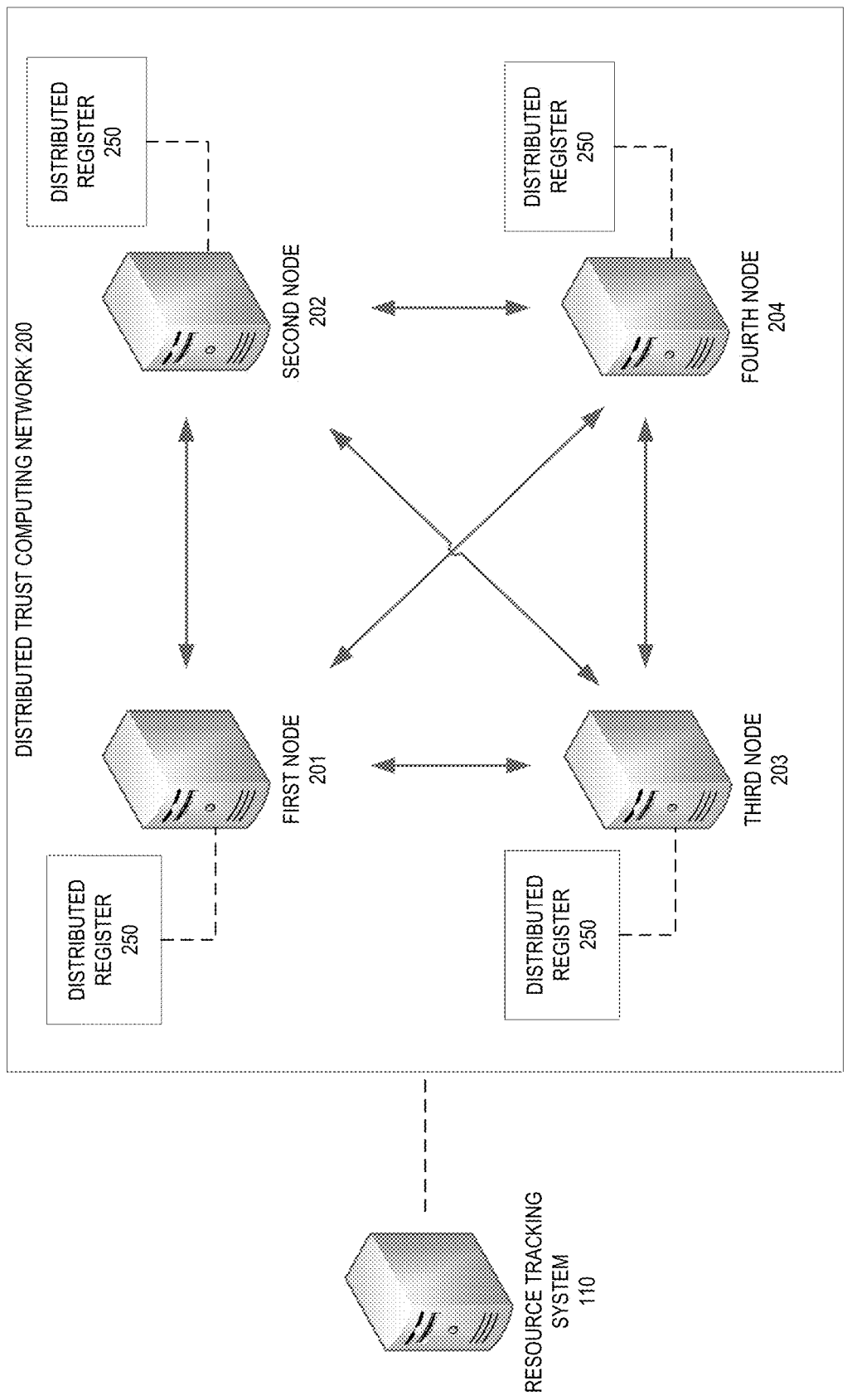
Figure 3:
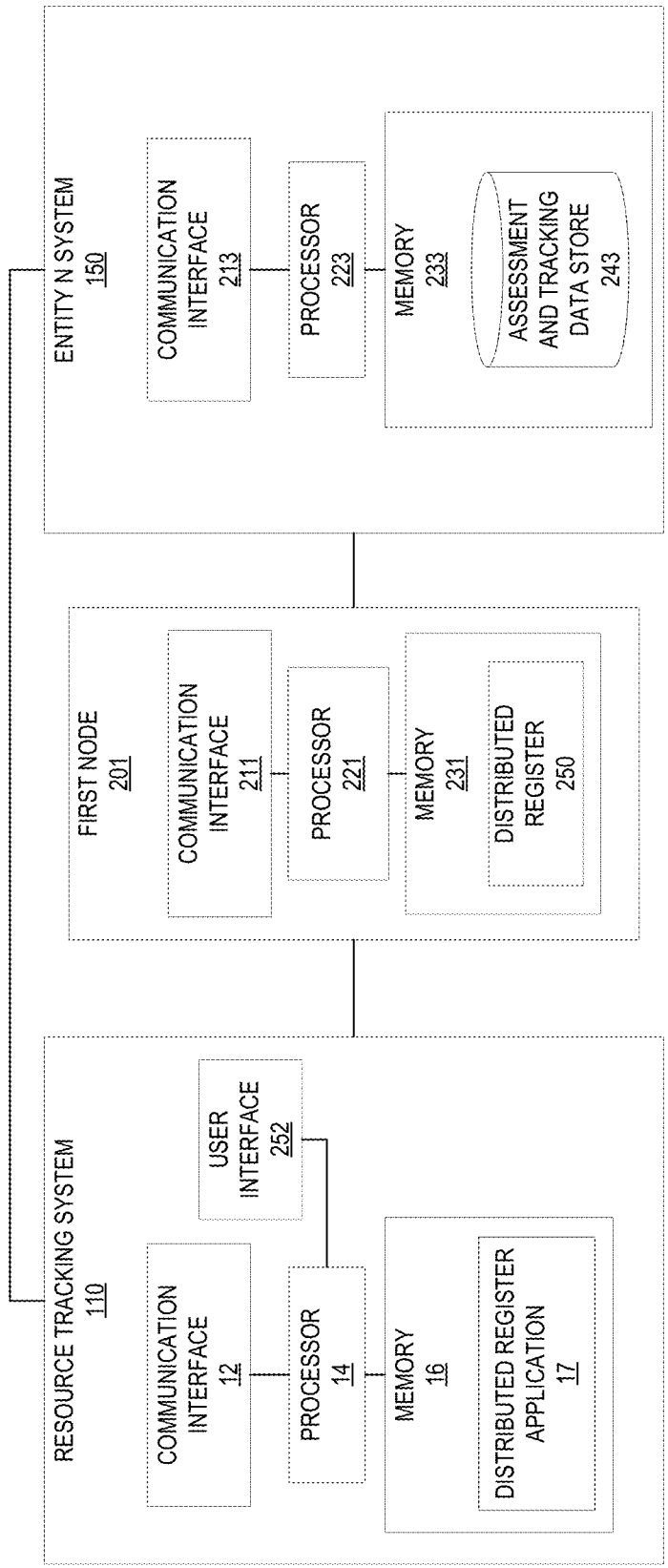
Figure 4:
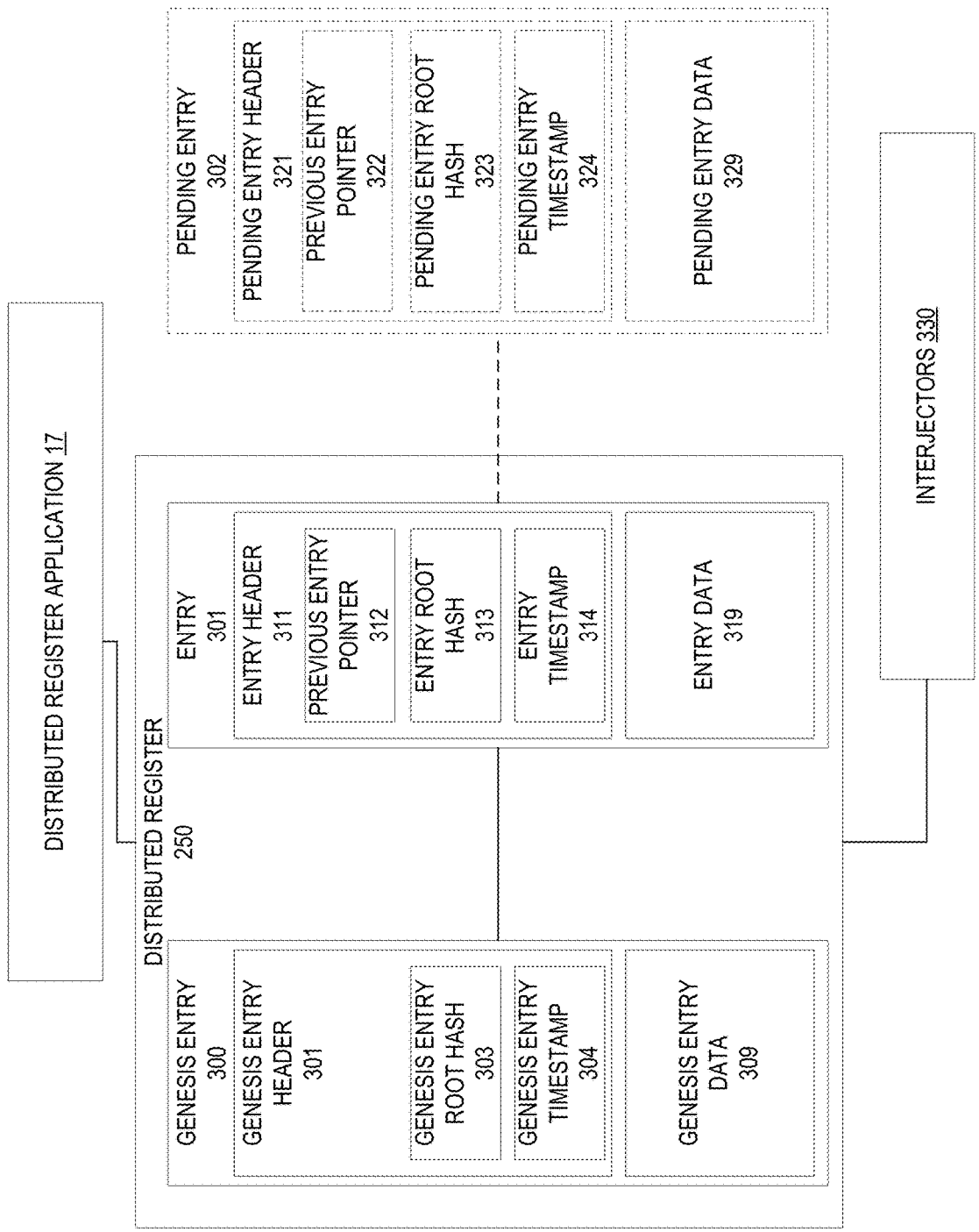
Figure 5:
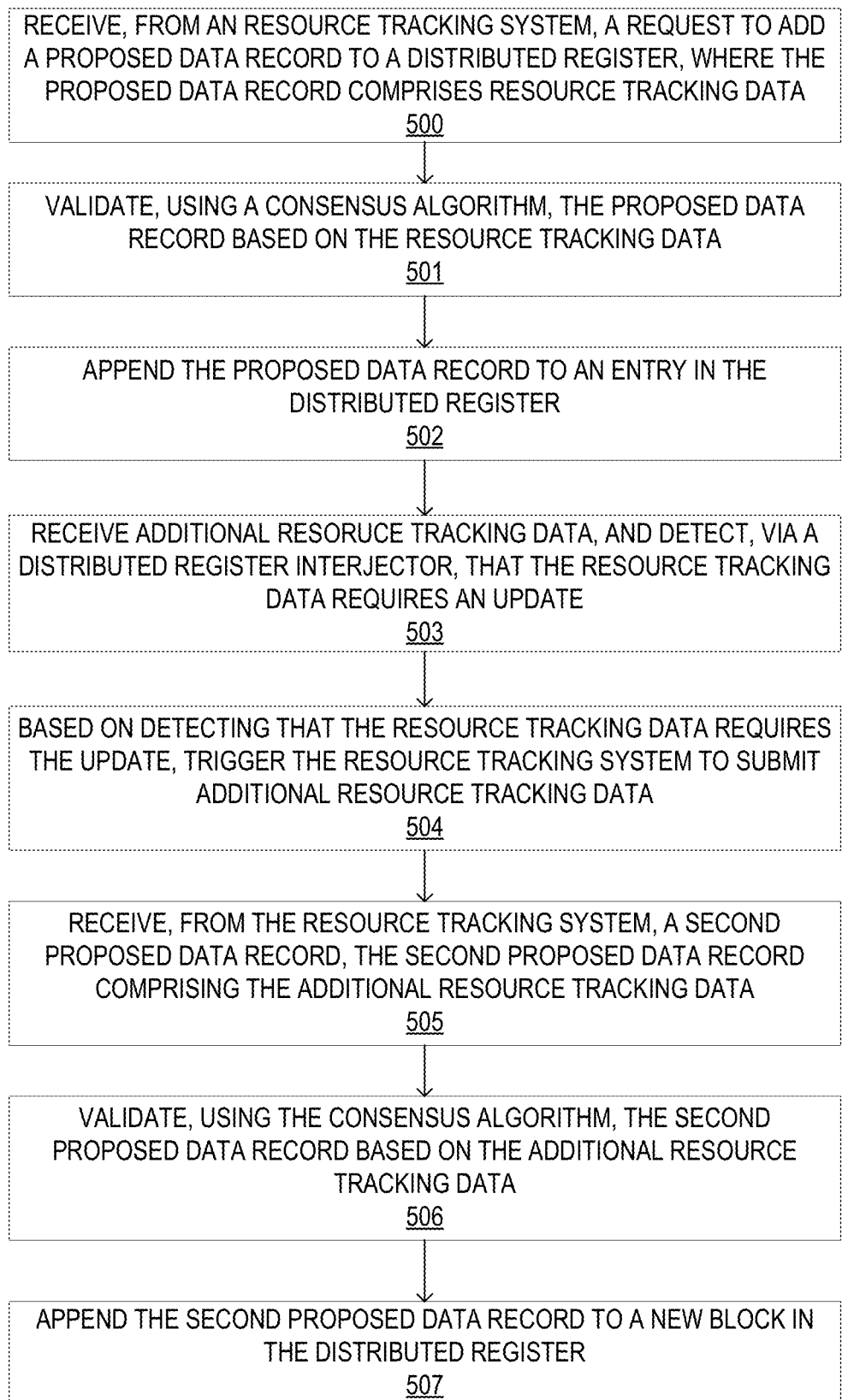
Figure 6:
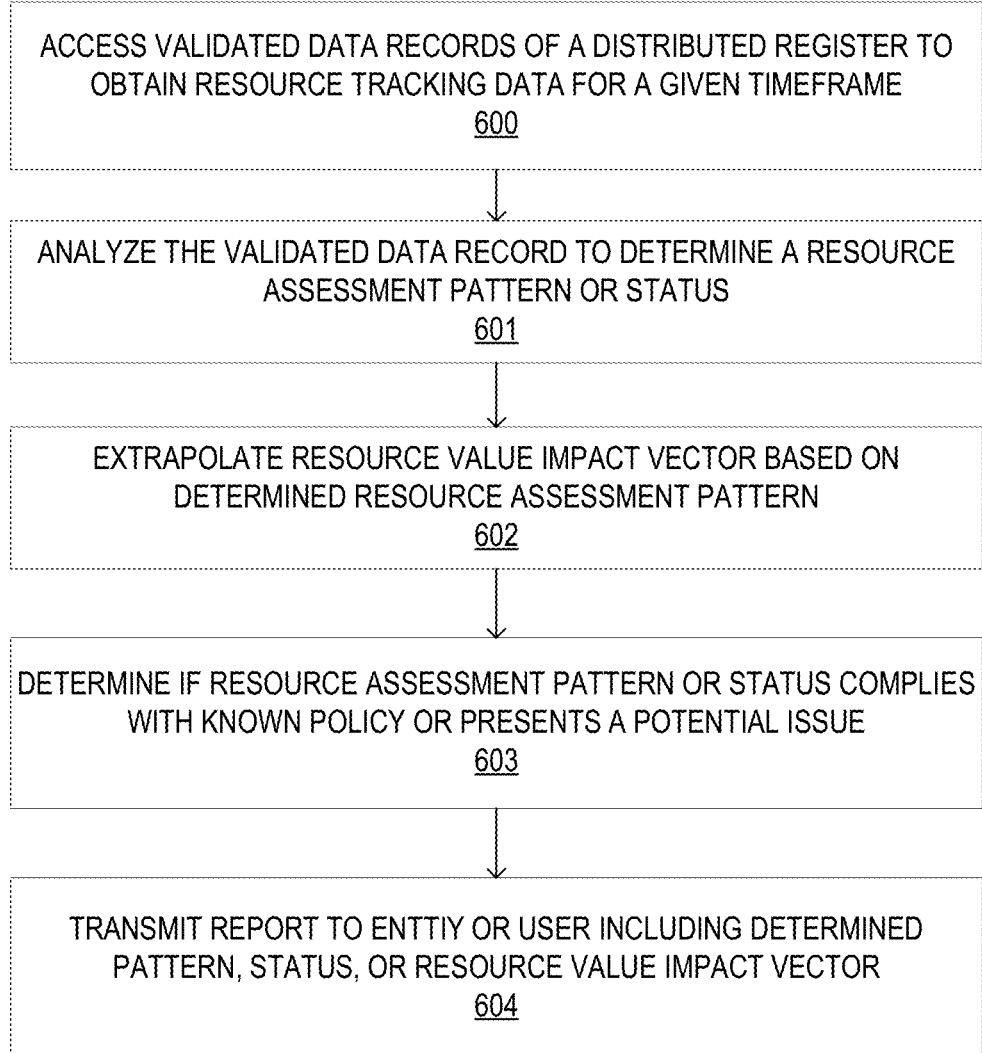

Having thus described embodiments of the disclosure in general terms, reference will now be made to the accompanying drawings, wherein:

FIG. 1 illustrates a resource tracking system environment 1, in accordance with embodiments of the present disclosure;

FIG. 2 is a block diagram illustrating an operating environment for the distributed trust computing network 200, in accordance with some embodiments of the present disclosure;

FIG. 3 is a block diagram illustrating the data structures within the distributed ledger, in accordance with some embodiments of the present disclosure;

FIG. 4 is a block diagram illustrating the data structures within the distributed register 250, in accordance with some embodiments of the present disclosure;

FIG. 5 is a process flow for the resource tracking system, in accordance with some embodiments of the present disclosure; and FIG. 6 is an additional process flow for the resource tracking system, in accordance with some embodiments of the present disclosure

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

"Entity" as used herein may refer to an individual or an organization that owns and/or operates an online system of networked computing devices, systems, and/or peripheral devices on which the distributed register system described herein is implemented. The entity may be a business organization, a non-profit organization, a government organization, and the like, which may routinely use various types of applications within its enterprise environment to accomplish its objectives.

"Entity system" as used herein may refer to the computing systems, devices, software, applications, and/or other resources used by the entity to perform resource assessments and tracking as well as store and manage resource tracking data. Accordingly, the entity system may comprise distributed register database servers, Internet-of-Things ("IoT") devices, networked terminals, smart devices (e.g., smart watches), and/or other types of computing systems or devices along with their associated applications.

"User" as used herein may refer to an individual who may interact with the entity system to store and/or manage resource tracking data or perform resource assessments. Accordingly, the user may be an agent, employee, associate, contractor, or other authorized party (e.g., an agent of a regulatory agency) who may access, use, administrate, maintain, and/or manage the computing systems within the entity system. Furthermore, as used herein the term "user device" or "mobile device" may refer to mobile phones, personal computing devices, tablet computers, wearable devices, diagnostic devices, and/or any portable electronic device capable of receiving and/or storing data therein.

"Computing system" or "computing device" as used herein may refer to a networked computing device within the entity system. The computing system may include a processor, a non-transitory storage medium, a communications device, and a display. The computing system may support user logins and inputs from any combination of similar or disparate devices. Accordingly, the computing system may be a portable electronic device such as a smartphone, tablet, single board computer, smart device, or laptop. In other embodiments, the computing system may be a stationary unit such as a personal desktop computer, networked terminal, IoT device, or the like within an entity's premises. In some embodiments, the computing system may be a local or remote server which is configured to send and/or receive inputs from other computing systems on the network.

"Distributed register" or "distributed electronic register" as used herein may refer to a structured list of data records that is decentralized and distributed amongst a plurality of computing systems and/or devices. In some embodiments, the distributed register may be a distributed ledger that includes a chain of entries or entries on a blockchain. As such, distributed register as used herein may also refer to a data structure which may comprise a series of sequentially linked "entries," or "entries," where each entry may comprise data and metadata. The "data" within each entry may comprise one or more "data record" or "transactions," while the "metadata" within each entry may comprise information about the entry, which may include a timestamp, a hash value of data records within the entry, and a pointer (e.g., a hash value) to the previous entry in the distributed register. In this way, beginning from an originating entry (e.g., a "genesis entry"), each entry in the distributed register is linked to another entry via the pointers within the entry headers. If the data or metadata within a particular entry in the distributed register becomes corrupted or modified, the hash values found in the header of the affected entry and/or the downstream entries may become mismatched, thus allowing the system to detect that the data has been corrupted or modified.

Generally, a distributed register is an "append only" register in which the data within each entry within the distributed register may not be modified after the entry is added to the distributed register; data may only be added in a new entry to the end of the distributed register. In this way, the distributed register may provide a practically immutable record of data over time.

"Permissioned distributed register" as used herein may refer to a distributed register for which an access control mechanism is implemented such that only known, authorized users may take certain actions with respect to the distributed register (e.g., add new data records, participate in the consensus mechanism, or the like). Accordingly, "unpermissioned distributed register" as used herein may refer to a distributed register without an access control mechanism.

"Private distributed register" as used herein may refer to a distributed register accessible only to users or devices that meet specific criteria (e.g., authorized users or devices of a certain entity or other organization). Accordingly, a "public distributed register" is a distributed register accessible by any member or device in the public realm.

"Node" as used herein may refer to a computing system on which the distributed register is hosted. Typically, each node maintains a full copy of the distributed register. In this way, even if one or more nodes become unavailable or offline, a full copy of the distributed register may still be accessed via the remaining nodes in the distributed register system.

"Consensus," "consensus algorithm," or "consensus mechanism" as used herein may refer to the process or processes by which nodes come to an agreement with respect to the contents of the distributed register. Changes to the distributed register (e.g., addition of data records) may require consensus to be reached by the nodes in order to become a part of the authentic version of the distributed register. In this way, the consensus mechanism may ensure that each node maintains a copy of the distributed register that is consistent with the copies of the distributed register hosted on the other nodes; if the copy of the distributed register hosted on one node becomes corrupted or compromised, the remaining nodes may use the consensus algorithm to determine the "true" version of the distributed register. The nodes may use various different mechanisms or algorithms to obtain consensus, such as proof-of-work ("PoW"), proof-of-stake ("PoS"), practical byzantine fault tolerance ("PBFT"), or the like.

A "resource" as used herein may refer to a vehicle, machine, or other mechanical device that may be tracked by an entity in terms of location, status, value, policy, regulation, use, and the like. "Resource tracking data" as used herein may refer resource status data, metadata (e.g., temporal data, location data, identified patterns, and the like), resource tracking parameters (e.g., logged OBD readings, ownership information, service information, finance information, VIN number, and the like), inputs to the resource tracking parameters, or the like. An "on-board diagnostic device" or "OBD" may refer to a device attached to the resource which is responsible for collecting or transmitting resource tracking data from onboard the resource itself.

In this regard, embodiments of the present disclosure provide a system, computer program product, and method for using a distributed register to conduct, manage, and store resource tracking data. In particular, the entity system may comprise a resource inventory tool which contains a list of all of the resources in use within the entity system and the various components of the resources. Each resource or resource component within the resource inventory may be assessed using one or more assessment or tracking parameters. In some embodiments, the resource assessments and tracking may be conducted by a user within the entity system. In other embodiments, the resource assessments and tracking may be conducted automatically by one or more computing systems within the entity system. Once an assessment of a resource or its components has been performed, the results of the assessment may be submitted (e.g., as a pending tracking data record) to be stored within an entry in the distributed register.

In some embodiments, the pending data record containing the proposed resource tracking and assessments may be evaluated for validity via a consensus algorithm, where the consensus algorithm may require that a plurality of computing systems transmit approvals of the proposed data record to one another before the proposed data record is added to the distributed register. In an exemplary embodiment, an application may be assessed according to a number of assessment parameters, where the assessment parameters indicate various conditions, use levels, locations, ownership, and the like. In such embodiments, the assessment data may be analyzed to ensure that each assessment parameter for a given resource is properly up to date or within a compliance threshold (e.g., a "compliant" or "non-compliant" indicator may relate to service of the resource or its various components, the registration, inspection, transfer of ownership, recordation of security interests with regard to the resource, the use history and type of use of the resource and the like). In some embodiments, one or more users may manually review the proposed resource assessments or tracking data and transmit approvals. In other embodiments, the review of the proposed resource assessments and tracking data, and transmission of approvals, may be conducted automatically by the computing systems (e.g., nodes) within the entity system.

Once the application tracking and assessments have been stored in an entry within the distributed register, the data stored therein within the distributed register may be treated by the entity as a single "true" source of tracking data. That said, over time, conditions may change such that an entity may wish to perform new or updated resource assessments. For example, new resources may be added to an inventory of resources, resources may be transferred or sold off and no longer tracked, or the assessment parameters may change such that certain data is no longer relevant, or new parameters are tracked. In another example, there may be new developments in regulations or policies that necessitate a reassessment of resources within the inventory of the entity system or an outside entity system.

In this regard, the resource tracking system may comprise one or more "interjectors." "Interjector" as used herein may refer to a set of executable program code which may, based on detecting the occurrence of a particular condition, trigger a change in one or more assessment parameters with respect to a certain resource. In an exemplary embodiment, a "service" or "threshold" interjector may detect the existence of a certain resource or resource component threshold being met. In some embodiments, the interjector may detect the existence of said condition based on receiving manual input by a user within the entity's systems. In other embodiments, the interjector may detect the existence of said condition automatically, such as by communicating with a resource, database, or entity system over a network. Upon detecting the occurrence of a particular condition, the interjector may trigger the addition or change in one or more assessment parameters by prompting a user to reassess the resource or by automatically prompting a computing system (e.g., a resource tracking computing system) to perform the reassessment. In some embodiments, the interjectors may be stored and/or executed on computing systems separate from the distributed register nodes. In other embodiments, the interjectors may be stored as smart contract logic as a feature of the distributed register. Using interjectors in this way helps alleviate the efficiency burden (e.g., computing efficiency) of performing repeated or duplicate assessments unnecessarily, as there is no need to reassess an resource; until the interjector triggers such a reassessment, the current state of the distributed register may be taken as the single source of "truth."

The resource tracking system may further comprise a user interface through which a user may interact with the distributed register. The user interface may comprise graphical elements that allow the user to define, add, and/or update applications, resource assessments, and/or assessment parameters within the distributed register. The user interface may further comprise notification functions which may display alert messages and/or play audible alerts. For instance, an interjector may prompt the user to define an additional assessment parameter by displaying a notification message via a notification window. The user interface may further be configured to allow the user to add, edit, or configure the various interjectors and/or their associated conditions or triggers.

The system as disclosed herein addresses a number of technology-centric challenges associated with assessing and tracking resources and managing resource data. By using a distributed register with interjectors as described herein, the system may reduce the occurrence of inconsistent assessment data, duplicative assessments, uncertainty about a resources condition, use level, ownership, location, and/or compliance with regulations or policies, or the like. In turn, the computing efficiency associated with performing resource assessments within the entity system may be greatly increased. Furthermore, storing assessment and tracking data within a distributed register helps ensure the integrity and security of the assessment and tracking data, thereby reducing the likelihood of data loss through corruption and/or tampering.

FIG. 1 illustrates a resource tracking system environment 1, in accordance with embodiments of the invention. As illustrated in FIG. 1, resource tracking systems 110 are operatively coupled, via a network 100, to one or more user devices 120, entity 1 systems 130, entity 2 systems 140, entity N systems 150 (e.g., any number of other entity systems), or other like systems. It should be understood that the resource tracking systems 110 may comprise the systems that are utilized to manage the resource tracking system environment 1. It should be further understood that the nodes of a distributed computing network 200, further described with regard to FIG. 2, may comprise both resource tracking systems 110 and user devices 120. The user devices 120, or a portion thereof, may also be nodes of the distributed computing network 200 (e.g., may be a system of the resource tracking systems 110). Alternatively or additionally, the user devices 120 may be associated with individual entities (e.g., entity 1, entity 2, entity N, which may be companies, individual users, or the like), or may be part of an entity system 130, 140, 150. The user devices 120 may access nodes of the resource tracking systems 110 on behalf of an entity (e.g., organizations, individual users, or the like). Furthermore, the entity systems 130, 140, 150, or a portion thereof, may be nodes of the resource tracking systems 110. Alternatively, or additionally, the user devices 120 and/or the organization systems 130, 140, 150 may not be nodes (e.g., not a part of the resource tracking systems 110, and instead are used merely to operate the organization systems and/or access the resource tracking systems 110.

Consequently, the resource tracking systems 110 may be separate systems that are nodes for distributed computing network 200 and/or in some embodiments may include the user devices 120 and/or organization systems 130, 140, 150, or a portion thereof as nodes. As such, regardless of whether or not the user devices 120 are nodes, the users 102 may utilize the user devices 120 to access, store, distribute, or the like resource information related to resources on a distributed register, as will be described in further detail herein. In some embodiments, the resource tracking systems 110 may be private distributed register systems, public distributed register systems, or hybrid distributed register systems (public and private distributed register systems), which will be described in further detail herein.

The environment 1 may be a system specific distributive network receiving and distributing specific network feeds and identifying specific network associated triggers. The network may include one or more cellular radio towers, antennae, cell sites, base stations, telephone networks, cloud networks, radio access networks (RAN), WiFi networks, or the like. Additionally, the network may also include a global area network (GAN), such as the Internet, a wide area network (WAN), a local area network (LAN), or any other type of network or combination of networks. Accordingly, the network may provide for wireline, wireless, or a combination wireline and wireless communication between devices on the network.

As illustrated in FIG. 1, the resource tracking systems 110 generally comprise one or more communication components 12, one or more processing components 14, and one or more memory components 16. The one or more processing components 14 are operatively coupled to the one or more communication components 12 and the one or more memory components 16. As used herein, the term "processing component" or "processor" generally includes circuitry used for implementing the communication and/or logic functions of a particular system. For example, a processing component 14 may include a digital signal processor component, a microprocessor component, and various analog-to-digital converters, digital-to-analog converters, and other support circuits and/or combinations of the foregoing. Control and signal processing functions of the system are allocated between these processing components according to their respective capabilities. The one or more processing components 14 may include functionality to operate one or more software programs based on computer-readable instructions 18 thereof, which may be stored in the one or more memory components 16.

The one or more processing components 14 use the one or more communication components 12 to communicate with the network 100 and other components on the network 100, such as, but not limited to, the user devices 120, the entity 1 systems 130, the entity 2 systems 140, the entity N systems 150, or other like systems. As such, the one or more communication components 12 generally comprise a wireless transceiver, modem, server, electrical connection, electrical circuit, or other component for electronically communicating with other components on the network 100. The one or more communication components 12 may further include an interface that accepts one or more network interface cards, ports for connection of network components, Universal Serial Bus (USB) connectors and the like.

As further illustrated in FIG. 1, the resource tracking systems 110 comprise computer-readable instructions 18 stored in the memory component 16, which in one embodiment includes the computer-readable instructions 18 of the distributed register applications 17. In some embodiments, the one or more memory components 16 include one or more data stores 19 for storing data related to the resource tracking systems 110, including, but not limited to, data created, accessed, and/or used by the distributed register application 17.

It should be understood that the resource tracking systems 110, and the components therein, may be one or more private distributed registers, one or more public distributed registers, and/or one or more hybrid distributed registers.

The resource tracking systems 110 and distributed register application 17, as will be described in further detail herein, may allow for resource tracking (e.g., vehicle tracking, or the like), such as for tracking of resource events (e.g., sales, damage, repairs, maintenance, upgrades, or the like), resource configurations (e.g., components, packages, mileage, model, make, or the like), and for the determination of resource suggestions (e.g., recommended maintenance, or the like) based on resource performance and resource thresholds (e.g., stored requirements for resource events). As explained in further detail later the distributed register systems 10 may be located in or associated with the other systems described herein.

As illustrated in FIG. 1, users 102 may access the distributed register application 17 on the one or more distributed systems 10, or a portion thereof stored on other systems (e.g., a portion of the distributed application 17 stored on other user devices 20 or on the entity systems 130, 140, 150), or through other applications, through the user devices 120. The user device 120 may be a desktop, laptop, tablet, mobile device (e.g., smartphone device, or other mobile device), or any other type of computer that generally comprises one or more communication components 22, one or more processing components 24, and one or more memory components 26. In some embodiments the user device 120 may represent a resource that provides data to the resource tracking systems 110 or one or more entity systems 130, 140, or 150. In some embodiments, the user device 120 may be an on-board diagnostic (OBD) device component that is responsible for logging and communicating data about the resource to the resource tracking system 110. In other embodiments, the user device 120 may be a resource that is tracked by the resource tracking system 110 using an auxiliary user device 122, which may represent an OBD device that tracks and communicates data about the resource's components and status. It is understood that the auxiliary user device 122 may include the same or similar components as the user device 120, such as one or more communication components, one or more processing components, one or more memory components, computer readable instructions, applications, and datastore.

The one or more processing components 24 are operatively coupled to the one or more communication components 22, and the one or more memory components 26. The one or more processing components 24 use the one or more communication components 22 to communicate with the network 100 and other components on the network 100, such as, but not limited to, the resource tracking systems 110, the entity 1 systems 130, the entity 2 systems 140, the entity N systems 150, or other systems. As such, the one or more communication components 22 generally comprise a wireless transceiver, modem, server, electrical connection, or other component for communicating with other components on the network 100. The one or more communication components 12 may further include an interface that accepts one or more network interface cards, ports for connection of network components, Universal Serial Bus (USB) connectors and the like. Moreover, the one or more communication components 22 may include a keypad, keyboard, touch-screen, touchpad, microphone, mouse, joystick, other pointer component, button, soft key, and/or other input/output component(s) for communicating with the users 102.

As illustrated in FIG. 1, the user devices 120 may have computer-readable instructions 28 stored in the one or more memory components 26, which in one embodiment includes the computer-readable instructions 28 of applications 27, such as dedicated applications (e.g., apps, applet, or the like), portions of dedicated applications, web browser or other apps that allow access to applications located on other systems, or the like. As previously discussed, the distributed register application 17, or a portion thereof, may be stored on one or more of the user device 120.

In some embodiments the user device 120 may be operatively coupled to a resource in order to become a resource system (e.g., capture information from the resource and transfer the information). For example, the user device 120 may connect to the resource through a wire or communicate wirelessly with the resource. Additionally, or alternatively, the user device 120 may be a resource system that is integral within the resource, and thus, have the same components as described with respect to the user device 120. As such, in some embodiments the resource may communicate directly with other systems over the network 100. Consequently, in some embodiments the resource system may be a node within the resource tracking system environment 1.

As illustrated in FIG. 1, the entity 1 systems 130, the entity 2 systems 140, the entity N systems 150, or other systems are operatively coupled to the resource tracking systems 110 and/or user devices 120, through the network 100. These systems have components that are the same as or similar to the components described with respect to the resource tracking systems 110 and/or user devices 120 (e.g., one or more communication components, one or more processing components, and one or more memory devices with computer-readable instructions of one or more applications, one or more datastores, or the like). Thus, the entity 1 systems 130, the entity 2 systems 140, the entity N systems 150, or other systems communicate with the resource tracking systems 110, the user devices 120, and/or each other in same or similar way as previously described with respect to the resource tracking systems 110 and/or the user devices 120. The entity systems 130, 140, 150 may be made up of one or more user devices 120, one or more of the resource tracking systems 110, or portions of any of the foregoing systems, and as such may act as nodes (explained in further detail with respect to FIG. 2) which are utilized to store, allow access to, disseminate, validate, or the like resource information.

FIG. 2 is a block diagram illustrating an operating environment for the distributed trust computing network 200, in accordance with some embodiments of the present disclosure. In particular, the operating environment may include a plurality of distributed register nodes 201, 202, 203, 204 in operative communication with one another within the distributed trust computing network 200. The distributed trust computing network 200, as well as other networks as described herein, may be a global area network (GAN), such as the Internet, a wide area network (WAN), a local area network (LAN), or any other type of network or combination of networks. The network may provide for wireline, wireless, or a combination wireline and wireless communication between devices on the network.

The first distributed register node 201, the second distributed register node 202, the third distributed register node 203, and the fourth distributed register node 204 may be computing systems which host the distributed register 250. In some embodiments, the distributed register 250 may comprise the assessment data for all resources within the entity system. Accordingly, the distributed ledger nodes 201, 202, 203, 204 are typically networked terminals or servers, but may also be desktop computers, laptops, smartphones or smart devices, IoT devices, or the like, or any combination thereof. Typically, each distributed register node 201, 202, 203, 204 hosts a complete copy of the distributed register 250. The contents of the various copies of the distributed register 250 hosted on the distributed register nodes 201, 202, 203, 204 may be updated to be consistent with one another via a consensus algorithm executed by the distributed register nodes 201, 202, 203, 204. In this way, a complete and verified copy of the distributed register 250 may remain accessible even if the copy of the distributed register 250 stored on one or more distributed register nodes 201, 202, 203, 204 become inaccessible (e.g., due to being offline, experiencing high network latency, or the like) or corrupted (e.g., due to hardware/software errors, unauthorized modification of distributed register contents, or the like).

The operating environment may further comprise a resource tracking system 110 which may be in operative communication with the distributed register nodes 201, 202, 203, 204 of the distributed trust computing network 200. The resource tracking system 110 may be a computing system that submits assessment and tracking data to the nodes 201, 202, 203, 204 in the form of proposed data records to be added to the distributed register 250. The resource tracking system 110 may further be used to manage interjectors and receive notifications regarding the assessment data within the distributed register 250. Accordingly, the resource tracking system 110 may be a desktop computer, laptop computer, smartphone, tablet, smart device, IoT device, single board computer, or the like. In some embodiments, resource tracking system 110 may be operated by a user within the entity. In other embodiments, the resource tracking system 110 may automatically perform various functions to manage assessment and tracking data and/or interjectors.

It should be understood by those having ordinary skill in the art that although the distributed register nodes 201, 202, 203, 204, and/or the resource tracking system 110 are depicted as single units, each of the depicted components, or sub-components therein, may represent multiple units. In some embodiments, a given computing system as depicted in FIG. 2 may represent multiple systems configured to operate in a distributed fashion. In other embodiments, the functions of multiple computing systems may be accomplished by a single system. For instance, the functions of the resource tracking system 110 may be accomplished by one or more of the distributed register nodes 201, 202, 203, 204. It should further be understood that even though reference may be made to a single "distributed trust computing network 200," all singular usages of "distributed trust computing network" or "distributed register" may also refer to multiple distributed registers. For instance, separate distributed registers may be stored on the nodes 201, 202, 203, 204 on a per-application or per-parameter basis.

FIG. 3 is a block diagram illustrating the first distributed register node 201 and the resource tracking system 110 in more detail, in accordance with some embodiments of the present disclosure. The first node 201 may comprise a processor 221 communicably coupled to such devices as a communication interface 211 and a memory 231. It should be understood that the first node 201 as depicted in FIG. 3 may represent any or all of the distributed register nodes 201, 202, 203, 204 as depicted in FIG. 2. The processor 221, and other processors described herein, typically includes circuitry for implementing communication and/or logic functions of the computing systems or devices as described herein. For example, the processor 221 may include a digital signal processor device, a microprocessor device, and various analog to digital converters, digital to analog converters, and/or other support circuits. The first node 201 may use the communication interface 211 to communicate with other devices over the distributed trust computing network 200. The communication interface 211 as used herein may include an Ethernet interface or other type of data port, an antenna coupled to a transceiver configured to operate on a cellular data, GPS, or WiFi signal, and/or a near field communication ("NFC") interface. In some embodiments, a processing device, memory, and communication device may be components of a controller, where the controller executes one or more functions based on the code stored within the memory.

The memory 231 of the first node 201 may comprise a copy of the distributed register 250. As used herein, "memory" includes any computer readable medium (as defined herein below) configured to store data, code, or other information. The memory may include volatile memory, such as volatile Random Access Memory (RAM) including a cache area for the temporary storage of data. The memory may also include non-volatile memory, which can be embedded and/or may be removable. The non-volatile memory can additionally or alternatively include an electrically erasable programmable read-only memory (EEPROM), flash memory or the like. In some embodiments, the memory 231 of the first node 201 may further comprise smart contract logic for one or more interjectors.

Typically, the first node 201, along with the other nodes within the distributed trust computing network 200, maintain a complete copy of the distributed register 250. The first node 201 may be configured to communicate with the other nodes to determine the contents of the distributed register 250 stored thereon. For instance, the nodes within the distributed trust computing network 200 may use one or more consensus algorithms (e.g., Proof-of-Work, Proof-of-Stake, Practical Byzantine Fault Tolerance, or the like) to add proposed data records to each of the individual copies of the distributed register 250. In other embodiments, the nodes 201, 202, 203, and 204 may execute smart contract logic to add proposed data records.

As discussed in FIG. 1, the resource tracking system 110 may also comprise a processor 14 communicatively coupled with such devices as a communication interface 12 and a memory 16. Typically, the resource tracking system 110 interacts with the first node 201 to access the distributed register 250 therein. Accordingly, the resource tracking system 110 may be a desktop computer, networked terminal, laptop computer, tablet, smartphone, or the like. In embodiments in which the resource tracking system 110 is operated by a user, the assessments computing system 110 may be configured to interface with the user, who may use the resource tracking system 110 to access the access, view, and/or submit proposed data records within the distributed register 250. The resource tracking system 110 may further be used to manage the distributed register interjectors. In this regard, the resource tracking system 110 may further comprise a user interface 252, which may comprise the hardware and software implements to accept input from and provide output to the user. The user interface 252 may comprise hardware such as a display, audio output devices, projectors, and the like, or input devices such as keyboards, mice, sensors, cameras, microphones, biometric input devices (e.g., fingerprint readers), and the like. The user interface 252 may further comprise software such as a graphical or command-line interface through which the user may provide inputs and/or receive outputs from the resource tracking system 110. It should be understood that the display on which the user interface 252 is presented may include an integrated display (e.g. a tablet or smartphone screen) within the resource tracking system 110, or an external display device (e.g. a computer monitor or television).

The memory 232 of the resource tracking system 110 may comprise a distributed register application 17 stored thereon. The distributed register application 17 may include software that allows the resource tracking system 110 to submit proposed data records to the distributed register 250, where the proposed data records comprise application assessment data (e.g., resource VIN number, ID number, ownership or lease information, vehicle component parameters, service history, or the like). In some embodiments, the resource tracking system 110 may automatically submit tracking and assessment data to the distributed register 250. In such embodiments, the distributed register application 17 may be configured to upload data to the first node 201 upon being prompted by a distributed register interjector. In other embodiments, a user may use the resource tracking system 110 to upload data and/or participate in consensus to validate proposed data records. In such embodiments, the distributed register application 17 may include an entity-provided application or other third party application which interfaces with the user to allow the user to communicate with the first node 201. For instance, in some embodiments, the distributed register application 17 may include a web browser or the like which allows the user to access a web server to upload data, participate in validation of data records, manage distributed register interjectors, or the like. In certain embodiments, the distributed register application 17 may further comprise distributed register interjectors which prompt the addition or update of data within the distributed register 250.

The first node 201 and/or the resource tracking system 110 may further be in operative communication with one or more entity systems, such as entity system N 150. The entity system N 150 may comprise a communication interface 213, a processor 223, and a memory 233 having an assessment data store 243 stored thereon. The assessment and tracking data store 243 may comprise the types of data needed by the resource tracking system 110 to perform resource tracking. For example, the assessment data store 243 may comprise a continuously updated list of resource fleet information with which each resource within the entity system must provide. Based on the assessment data store 243, the resource tracking system 110 may define new parameters or update existing parameters for each resource tracking schema.

FIG. 4 is a block diagram illustrating the data structures within the distributed register 250, in accordance with some embodiments. In particular, FIG. 4 depicts a plurality of entries 300, 301 within the distributed register 250, in addition to a proposed entry 302 that has been submitted to be appended to the distributed register 250. The distributed register 250 may comprise a genesis entry 300 that serves as the first entry and origin for subsequent entries in the distributed register 250. The genesis entry 300, like all other entries within the distributed register 250, comprise a entry header 301 and entry data 309. The genesis entry data 309, or any other instances of entry data any entries in the distributed register 250 may contain various data records.

The genesis entry header 301 may comprise various types of metadata regarding the genesis entry data 309. In some embodiments, the entry header 311 may comprise a genesis entry root hash 303, which is a hash derived from an algorithm using the genesis entry data 309 as inputs. In some embodiments, the genesis root hash 303 may be a Merkle root hash, wherein the genesis entry root hash 303 is calculated via a hash algorithm based on a combination of the hashes of each data record within the genesis entry data 309. In this way, any changes to the data within the genesis entry data 309 will result in a change in the genesis entry root hash 303. The genesis entry header 301 may further comprise a genesis entry timestamp 304 that indicates the time at which the entry was written to the distributed register 250. In some embodiments, the timestamp may be a Unix timestamp. In some embodiments, particularly in distributed registers utilizing a PoW consensus mechanism, the entry header 301 may comprise a nonce value and a difficulty value. The nonce value may be a whole number value that, when combined with a hash of the other items of metadata within the entry header 301, produces a hash output that satisfies the difficulty level of the cryptographic puzzle as defined by the difficulty value. For instance, the consensus mechanism may require that the resulting hash of the entry header 301 falls below a certain value threshold (e.g., the hash value must start with a certain number of zeroes, as defined by the difficulty value).

A subsequent entry 301 may be appended to the genesis entry 300 to serve as the next entry in the distributed register. Like all other entries, the entry 300 comprises an entry header 311 and entry data 319. Similarly, the entry header 311 comprise an entry root hash 313 of the data within the entry data 319 and an entry timestamp 314. The entry header 311 may further comprise a previous entry pointer 312, which may be a hash calculated by combining the hashes of the metadata (e.g., the genesis entry root hash 303, genesis entry timestamp 304, and the like) within the entry header 301 of the genesis entry 300. In this way, the entry pointer 312 may be used to identify the previous entry (i.e., the genesis entry 300) in the distributed register 250, thereby creating a "chain" comprising the genesis entry 300 and the entry 301.

The value of a previous entry pointer is dependent on the hashes of the entry headers of all of the previous entries in the chain; if the entry data within any of the entries is altered, the entry header for the altered entry as well as all subsequent entries will result in different hash values. In other words, the hash in the entry header may not match the hash of the values within the entry data, which may cause subsequent validation checks to fail. Even if an unauthorized user were to change the entry header hash to reflect the altered entry data, this would in turn change the hash values of the previous entry pointers of the next entry in the sequence. Therefore, an unauthorized user who wishes to alter a data record within a particular entry must also alter the hashes of all of the subsequent entries in the chain in order for the altered copy of the distributed register to pass the validation checks imposed by the consensus algorithm. Thus, the computational impracticability of altering data records in a distributed register in turn greatly reduces the potential of improper alteration of data records.

A pending entry 302 or "proposed entry" may be submitted for addition to the distributed register 250. The pending entry 302 may comprise a pending entry header 321, which may comprise a pending entry root hash 323, a previous entry pointer 322 that points to the previous entry 301, a pending entry timestamp 324, and pending entry data 329. Once a pending entry 302 is submitted to the system, the nodes within the system may validate the pending entry 302 via a consensus algorithm. The consensus algorithm may be, for instance, a proof of work mechanism, in which a node determines a nonce value that, when combined with a hash of the entry header 311 of the last entry in the distributed register, produces a hash value that falls under a specified threshold value. For instance, the PoW algorithm may require that said hash value begins with a certain number of zeroes. Once said nonce value is determined by one of the nodes in the distributed register, the node may post the "solution" to the other nodes in the distributed register. Once the solution is validated by the other nodes, the hash of the entry header 311 is included in the pending entry header 321 of the pending entry 302 as the previous entry pointer 322. The pending entry header 321 may further comprise the pending entry root hash 323 of the pending entry data 329 which may be calculated based on the winning solution. The pending entry 302 is subsequently considered to be appended to the previous entry 301 and becomes a part of the distributed register 250. A pending entry timestamp 324 may also be added to signify the time at which the pending entry 302 is added to the distributed register 250. In other embodiments, the consensus mechanism may be based on a total number of submissions by the nodes of the distributed register 250, e.g., a PBFT consensus mechanism. Once a threshold number of submissions to validate the pending entry 302 has been reached, the pending entry 302 may be appended to the distributed register 250. In such embodiments, nonce values and difficulty values may be absent from the entry headers.

The system described herein may use one of several different paradigms for entry creation. In some embodiments, an entry may be generated whenever new assessment parameters or applications are defined. In some embodiments, the system may wait to receive inputs for all known assessment parameters for all applications before generating an entry. In other embodiments, entries may be generated on a per-application basis. In yet other embodiments, new entries may be generated for each assessment that is made by the resource tracking system. Other possibilities exist, as the entity may select its entry generation methods based on striking a balance between computing efficiency and detailed record keeping over a period of time.

The resource tracking system, via the distributed register application 17, may submit a proposed data record to the distributed register 250, where the proposed data record may comprise a new or updated assessment parameter, resource data, new or updated metadata regarding a resource, or the like. In this way, the distributed register application 17 may be used to manage data, tracking parameters, assessment data, and the like. Furthermore, because such data is added in time-stamped entries to the distributed register, the system is able to reliably and accurately recreate the state of the resources) within the entity system at any particular point in time.

The data records may comprise resource tracking or assessment data associated with each resource within the entity system (e.g., fleet of vehicles, inventory of vehicles, single vehicles, and the like). In particular, each resource within the entity system may be assigned an resource identifier (e.g., a character string, hash value, numerical identifier, or the like). For instance, in some embodiments, the resources may be labeled in numerical order (e.g., Resource 1, Resource 2, and the like). In other embodiments, the resources may be logged according to an existing resource identifier, such as a vehicle identification number (VIN). In further embodiments, the existing VIN number may be logged as associated with a separate resource identifier that is used to log data in the distributed register (e.g., VIN number 1 associated with Resource 1, and the like). The assessment or tracking parameters used to track each resource may also each be assigned an assessment parameter identifier. For instance, the assessment parameters may be numbered (e.g., Assessment Parameter 1, Assessment Parameter 2, and the like). Assessment parameters may include, but are not limited to, tracking each particular resource's financing terms, financed amount, payoff amount, current market value, title information, registration information, maintenance history, anticipated maintenance, repairs, service, and the like.

Assessment parameters may also include resource performance or status information received from the resource itself, such as via an OBD device. Data received from an OBD device may include real time information about a resource, or logged information about a resource, such as data regarding the resource's various mechanical components (e.g., engine performance, fuel consumption, transmission, tire pressure, speed, acceleration, location, accelerometer data, power output, and the like). An OBD device may be located on the user device 120 and transmitted directly to the resource tracking system 110 over a wireless network connection, such as over network 100. In other embodiments, resource assessment and tracking data may be received and compiled by the entity system 130, 140, or 150 before being forwarded to the resource tracking system 110. In either case, the assessment and tracking data may be used to perform further calculations and make extrapolated determinations about a particular resource's condition or status.

For instance, assessment or tracking data received by the resource tracking systems 110 may be used to calculate an expected future resale value given an average mileage rate (e.g., miles driven per day, month, year, and the like) received from a particular resource, forecasting total mileage at given point in the future, and comparing the resource to other similar known resources currently for sale. In other embodiments, the resource tracking system 110 may receive assessment or tracking data indicating a particularly harsh driving style (e.g., a pattern of abrupt acceleration or braking as evidenced by accelerometer or speedometer readings correlating to a gravitational force (g-force) at a certain threshold, and the like), or a potentially problematic maintenance record (e.g., missed service appointments, missed inspection dates, and the like) that could also be used to factor into a "wear and tear" variable used to adjust forecasted resale price or market value. For instance, the resource tracking system 110 may receive and store maintenance requirements from various manufacturers that determines the threshold requirements for being "certified" preowned, and the like. If a particular resource were to miss a service appointment and lose eligibility for certification by a particular manufacturer, this may negatively affect the resale value. Alternatively, the resource tracking system 110 may receive information that the resource has been damaged, which would affect the resource's resale value negatively. In these instances, the resource tracking system 110 may issue an alert to the entity or owner responsible for the resource with a warning, reminder, or forecasted value.

In other embodiments, a forecasted condition may not be as exact. For instance, the resource tracking system 110 may receive data indicating a harsh driving style, and an assumption may be made that the resource might incur a higher cost for maintenance or repairs in the future due to worn out mechanical components (e.g., based on the average lifespan of a given mechanical component, or as calculated by force, acceleration, and stress values as related to the material composition of a given component), or higher potential for a wreck occurring. Additionally, the resource tracking system 110 may extrapolate based on a harsh driving style that an operator of the resource likely has been harsh with regard to upkeep of the interior components of the resource.

In some embodiments, tracking and assessment data may also be useful for alerting an entity that the operator of a particular resource is handling the resource in a certain manner. For instance, the resource tracking system 110 may determine that the average g-force associated with operation of steering the resource through turns or accelerating the resource from a non-moving position is relatively higher than data received for other resources. The resource tracking system 110 may use this comparison to determine that the operator of the resource is driving in a relatively more reckless manner than other operators of resources in the same fleet, area, or entity. For instance, a ride sharing service may be interested to know how their employees are typically operating their resources so that they can use this information to calculate an operator safety rating. In some embodiments, a particular operator may be required or suggested to share resource tracking and assessment data with the resource tracking system 110 such that various entities can request access to at a later date via the distributed register and make determinations or ratings as to operator safety.

In further embodiments, the tracking and assessment data may be analyzed in a combined policy manner. For instance, the resource in question or operator of the resource may be subject to the policies and restrictions of more than one entity system, or of more than one federal or state law, regulation, and the like, and the collective analysis of such policies, laws, and restrictions may indicate a different scenario than simply analyzing each specific policy, law, or regulation alone. For instance, in one embodiment, the operator of the resource may be employed by more than one ride sharing service, as represented by entity system 1 130 (a "first entity") and entity systems 2 140 (a "second entity"). The first entity may set a policy that the operator may not operate the resource more than a given amount of time in a certain day (e.g., the operator may not carry passengers in a vehicle or drive a vehicle for more than a certain number of hours in one day). In some instances, this policy may be received from one of the multiple entities, or may be received via external databases or input, uploaded and the like by a user to the resource tracking system 110.

For instance, the resource tracking system 110 may receive data on federal, state, or local laws, policies, regulations, and the like. As the resource tracking system 110 receives data from the resource's OBD, the system may track the number of hours per day that the resource is in operation. In some embodiments, this data may be based on a specific component measurement, such as data received regarding the ignition switch, engine status, geo-location, accelerometer data, and the like. In other embodiments, it may be necessary to combine multiple component measurements to determine a status of operation. For instance, if a certain policy or restriction limits the number of hours per day that an operator is "driving" a vehicle, the resource tracking system would not be able to determine that the operator is "driving" by analyzing whether or not the resource is turned on or off, but may instead need to determine if geo-location, accelerometer data and the like also indicate a "driving" status while the engine status was "on." In other embodiments, the resource tracking system may require even further information from multiple entity systems, such as data indicating when the operator is driving passengers based on the operators "accepted rides" and the like. The resource tracking system may cross-reference this data with data received from the resource OBD to determine how many hours in one day that the operator has been operating a resource in total. This data, just like all other data received by the resource tracking system 110, may be stored on the distributed register for access by multiple entities. In other embodiments, the resource tracking system may determine that the operator has operated the resource for a total number of hours in a given day that collectively would exceed the policy maximum of one or more entities, but has done so in a manner where the first entity or the second entity alone would not be aware based on the data they collect.

In some embodiments, the first and second entity may both be ride sharing services, cargo shipping companies, and the like that have both may have set a policy that an operator may not exceed 11 hours of driving in a day. In some embodiments, the operator may be an independent contractor that is employed by the first and the second entity. Based on the data received by the resource tracking system, the system may determine that the operator has exceeded this limit while driving 6 hours for the first entity and 6 hours for the second entity. In some embodiments, the policy may be based on a federal or state law. For instance, the law may state that the operator may not drive passengers or cargo more than 11 hours per day. The resource tracking system may determine that the policy, law, regulation, or the like, has been exceeded, or is close to being exceeded as defined by a specific threshold (e.g., if the policy states that the operator may not exceed 11 hours of driving, the resource tracking system 110 may automatically set a threshold of 10 hours at which point it would generate an alert), and may generate and transmit an alert to the entities or operators which subscribe to, enforce, or are governed by the policy, law regulation, and the like. In some embodiments, the alert may be a general statement that the operator has exceeded a policy, is approaching a threshold near the policy limitation, and the like. For instance, the resource tracking system may generate a message such as "Attention, the Resource Tracking System has identified that Operator X has driven for X number of hours today based on data stored in the distributed register." In other embodiments the resource tracking system may generate a message such as "Attention, the Resource Tracking System has identified that Operator X is close to exceeding X number of driving hours today," based on a threshold some amount below the policy limit.

In other embodiments, the resource tracking system 110 may receive real-time data from the resources and determine that the assessment or tracking parameters indicate a potentially important condition, such as a wreck. For instance, the OBD device on a given resource may indicate that a surface or impact sensor on the resource has been triggered, or may indicate an abrupt change in speed as evidenced by the speedometer or accelerometer reading. In some embodiments, the resource tracking system may receive assessment or tracking data from two resources involved in the same accident, or request data from resources known to be nearby during the time of the accident. As such, the resource tracking system 110 may use this data stored in the distributed register to create a picture of how the wreck or accident occurred. In some embodiments, the resource tracking system 110 may receive data indicating that an accident has occurred, automatically gather data from the resources involved or nearby, and push this data to a particular entity, such as an insurance company, entity that owns the resources, a local police office, and the like. In some embodiments, the data may be pushed in a "pre-packaged" accident report that includes data about the circumstances surrounding the accident, such as the speed, location, acceleration, operating history, forecasted repair and post-accident resource values, and the like.

In any embodiment, the resource tracking system 110 may, via the distributed register application 17, participate in validating proposed assessment and tracking data records through a consensus algorithm, along with the nodes of the distributed register 250. For example, a new tracking parameter which addresses a new resource component may be proposed to be added to the distributed register 250. In such embodiments, the resource tracking system 110 may be used to verify that the new proposed resource component parameter adequately and accurately reflects the resource inventory. The resource tracking system 110 may further ensure that the data to be entered reflects that the resource tracking has been correctly executed. For instance, the system may require that certain resource component parameters with respect to a resource are verified before an assessment is considered to be valid (e.g., resource tracking system 110 may ping the resource to receive an updated odometer reading). If the required parameters are missing from the data, the resource tracking system 110 may either reject the proposed data record containing the data or delay validating the proposed data record until the missing inputs are provided.

As described above, assessment parameters are metrics or data points by which a resource is assessed or tracked. Some examples of assessment or tracking parameters may concern resource performance or status information received from the resource itself, such as via an OBD device, which may be represented by user device 120 or auxiliary user device 122. In other examples, the resources may be tracked or assessed according to ownership, financing information, predicted resource value, maintenance records, operating history, location history, and the like. Data received from an OBD device may include real time information about a resource, or logged information about a resource, such as data regarding the resource's various mechanical components (e.g., engine performance, fuel consumption, transmission, tire pressure, speed, acceleration, location, accelerometer data, power output, and the like). In other embodiments, the resource tracking system may store data related to a rule or policy compliance (e.g., whether the resource or operator of the resource complies with an internal or external rule, regulation, or policy, such as refraining from driving over the speed limit, staying within a leased mileage limit, remaining on a pre-determined or required delivery or travel route, and the like), technical issues (e.g., system requirements, operating system, software, and/or mechanical compatibility, support for standards and/or protocols, or the like), ownership, or the like. Each assessment parameter may be configured to receive an input from the resource tracking system 110, entity system, or resource itself via an OBD device that indicates the status of a particular parameter. Such inputs may be validated by a consensus algorithm before being accepted as part of the distributed register. For example, a valid entry for a particular assessment parameter may be binary values as valid entries (e.g., "yes" or "no," "0" or "1," or the like), such as when an assessment parameter concerns whether or not an application complies with a particular information security policy. In other embodiments, valid entries may be numbers, strings of characters and/or numbers, dates, hash values, or the like.

In some embodiments, the distributed register application 17 of the resource tracking system 110 may be used to define an initial set of parameters within the entry data (e.g., the genesis entry data 309) of an entry (e.g., the genesis entry 300) for each resource in the entity system. In such embodiments, when the resource tracking system 110 submits proposed data records to be appended to the distributed register 250 in subsequent entries, the consensus algorithm may require that a parameter and resource has been defined in one of the previous entries in order for the proposed data record to be considered valid. For instance, if a proposed data record comprises an assessment for Resource Parameter 1 with respect to Resource 1, the system may first verify that the Resource Parameter 1 and Resource 1 have been defined in a previous entry (e.g., the genesis entry 300). If the definitions of the parameter and resource are not found, the proposed data record may be considered to be invalid. It should be noted that while parameters may be defined in the genesis entry 300, it is within the scope of the disclosure for new or updated parameters and/or resources to be defined in any entry within the distributed register 250.

Over time, it may become necessary to adjust resource tracking processes in response to changes in the operating environment, entity requirements, resource fleet inventory, technical advances, new security threats, changes in regulations or policies, or the like. In this regard, the system may use one or more interjectors 330 to cause a new entry to be created which contains the new tracking parameters, data, and/or metadata. "Interjector" may generally refer to the hardware and software implements that trigger the addition or updating of data within a new entry (e.g., the pending entry 302). In some embodiments, the interjector may be stored on the resource tracking system 110. In other embodiments, the interjectors may be executed as smart contracts by the nodes of the distributed register 250.

An interjector 330 may detect the existence of a condition that requires a change in the metadata, tracking or assessment data, resource tracking parameters, or other type of data within the distributed register 250. For example, the "condition" may be the emergence of a new type of computer virus or security vulnerability which necessitates the evaluation of particular applications to assess their vulnerability to the virus or malfeasant code. In other embodiments, the condition may be a new internal policy with which all resources must comply, such as an emissions standard which in turn necessitates a renewed assessment of resources to ensure the compliance with the new policy. Upon detecting the condition, the interjector 330 may trigger the addition of new data records to the distributed register 250 via the distributed register application 17.

In embodiments in which the new data records are added manually, the interjector 330 may send an alert or notification to the user through the resource tracking system 110, where the alert or notification prompts the user to enter the necessary information (e.g., a renewed assessment, a new tracking parameter, or the like). The alert or notification may comprise a link (e.g., a hyperlink) that, when activated, opens a graphical interface on resource tracking system 110 (e.g., a web browser pointing to a web server) which provides graphical elements that allow the user to input the necessary information (e.g., resource data). Once the user submits the necessary information, the resource tracking system 110 may submit a proposed data record to the distributed register 250, where the proposed data record contains the information provided by the user to be incorporated into the distributed register 250. In embodiments in which the new data records are added automatically, the interjector 330 may cause the resource tracking system 110 to automatically retrieve resource data and submit the necessary information to the distributed register 250 in the form of a proposed data record.

Various types of interjectors 330 may be used to trigger the addition of data records to the distributed register. For example, the interjectors 330 may include a "recall or vulnerability interjector" that triggers inputs of assessment data relating to a new defect or vulnerability affecting a resource, a "policy interjector" or "regulations interjector" that triggers inputs of assessment data based on regulations or standards that affect a resource, a "reassessment clock interjector" or "periodic interjector" which triggers reassessments after a threshold period of time has elapsed since a resource has last been assessed (e.g., periodically retrieving vehicle mileage data, fuel consumption data, crash reports, service history, and the like), a "circumstance interjector" which triggers assessments based on the occurrence of certain incidents, events, or problems, or the like (e.g., service, repairs, transfer of ownership, and the like). It should be understood that the interjectors 330 described above are provided for exemplary purposes only, and that other types of interjectors 330 and/or triggers may be used depending on the entity's needs.

The system may further include a notification system that sends alerts or notifications based on the current verified state of the resources (e.g., vehicles) within the entity system. For instance, if the notification system detects that an assessment or tracking parameter has been defined but no assessment or tracking data with respect to the assessment or tracking parameter has been entered, the notification system may send an alert or notification to a user which prompts the user to enter the assessment or tracking data. In other embodiments, the notification system may detect that the assessment or tracking of a resource requires further action with respect to the resource. For example, the assessment or tracking data for a particular parameter (e.g., the resource's compliance with a particular emissions regulation) indicates that the resource fails to satisfy the assessment parameter (e.g., a vehicle has not been retrofitted with an emissions limiter, and the assessment data entered is a "0" or "no"). In such embodiments, the notification system may send an alert or notification to the user indicating that the specified resource does not comply with the particular regulation as referenced by the assessment parameter.

FIG. 5 is a process flow for the resource tracking system, in accordance with some embodiments of the present disclosure. The process begins at block 500, where the system receives, from the resource tracking computing system, a request to add a proposed data record to a distributed ledger, where the proposed data record comprises resource tracking data. The resource tracking data may comprise information regarding resources within an entity system and assessments performed on or data logged by the resources across various metrics previously described with regard to FIG. 4. Thus, in an exemplary embodiment, the resource tracking data may comprise resource metadata (e.g., temporal data, location data, identified patterns, and the like), resource tracking parameters (e.g., logged OBD readings, ownership information, service information, finance information, VIN number, and the like), inputs to the resource tracking parameters, or the like.

The application metadata may comprise information about the resources within the entity system at are to be assessed, such as resource VIN number and/or description, ownership information, model number, entity policies, emissions regulations, geolocation restrictions, temporal data, location data, identified patterns, or the like. The applications may be assessed according to a number of resource tracking or assessment parameters, such as whether a resource is operated in compliance with an internal or external rule, policy, or regulation, whether the resource has been properly serviced, involved in an accident, how many miles the resource has been driven in a given time frame, whether the resource is protected under warranty, whether the resource is vulnerable to decrease in value (e.g., decrease in value related to maintenance, driving habits, and the like), whether the application is affected by a certain incident or event (e.g., conversion, accident, and the like), or the like. Accordingly, the inputs to the resource tracking parameters (or "resource tracking parameter inputs") may comprise the findings of a resource with respect to a particular assessment or tracking parameter (e.g., a finding that a resource has received routine scheduled maintenance). In some embodiments, the resource tracking system may generate a proposed data record to be evaluated by the distributed register nodes. In other embodiments, a distributed register node may receive the request and generate the proposed data record based on the information contained in the request.

The process continues to block 501, where the system validates, using a consensus algorithm, the proposed data record based on the resource tracking data. The system may use one or several consensus algorithms in the various embodiments. For instance, the system may use a Practical Byzantine Fault Tolerance (PBFT) algorithm, through which each distributed register node performs a number of validation checks on the proposed data record (e.g., whether the required assessment parameters have been addressed by the correct assessment parameter inputs, whether the assessment parameters reference a valid resource, whether an resource referenced by an assessment parameter is currently in use by the entity, whether assessment parameter inputs reference a valid assessment parameter, or the like). Based on performing the validation checks, each node may submit to the other nodes in the distributed register network, where the submission is an approval or rejection of the proposed data record's validity. The PBFT algorithm may require that a threshold number of submissions (e.g., at least two-thirds of nodes submit "yes") in favor of approving the proposed data record are received by the nodes before the proposed data is added to the distributed register. In this way, even if specific nodes in the distributed register network become offline or unavailable (e.g., network disruptions, hardware failures, data corruption, or the like), the functionality of the distributed register may still be preserved.

In other embodiments, the consensus algorithm may be a PoW algorithm in which the nodes may continually perform computations to resolve a cryptographic puzzle set by the system (e.g., "mining"). Typically, a PoW algorithm may be employed by the system when the distributed register is a public distributed register wherein any member of the public may host a node and participate in consensus. In this way, the system may validate proposed data records even when the "trust levels" amongst the consensus participants are relatively low.

The process continues to block 502, where the system appends the proposed data record to an entry in the distributed register. Once the proposed data record has been validated by the consensus algorithm (e.g., the threshold number of submissions has been reached, or a node has calculated a "solution" to the cryptographic puzzle set by the system), the proposed data record may be considered to be a permanent part of the distributed register. Typically, the proposed data record is incorporated into the entry data portion of an entry in the distributed register. As described above, each entry may contain multiple data records, and new entries may be written upon the occurrence of certain events. For instance, a new entry may be written when an interjector triggers the creation of the new entry, as discussed in further detail below. Over time, the distributed register as described herein may provide a stable, durable, and tamper-resistant history of application assessments performed over time.

The process continues to block 503, where the system detects, via a distributed register interjector, that the resource tracking data requires an update. In some embodiments, an interjector may detect the occurrence of an event or condition that triggers the need for updated resource tracking data. For example, the interjector may detect that the ownership, maintenance record, odometer reading, financed principal balance, or the like for a specific resource has changed such that the assessment data within the distributed register no longer reflects the current state of reality. In other embodiments, an interjector may detect that a new policy or regulation has been placed into effect that necessitates a new or updated assessment parameter. In another embodiment, the interjector may receive periodic updates from an entity system, user device, or auxiliary user device that reflect OBD readings in real time, over a specific frequency (e.g., updated data sent every day, every week, or the like), or in response to a request by the resource tracking system for an entity, user device, resource, or auxiliary user device to provide updated assessment data. In yet other embodiments, the interjector may detect that a new security vulnerability has been found (e.g., by retrieving data from a threat database or manufacturer regarding a security threat, safety recall, or vulnerability concern as to a component of the resource) and determine that a new assessment parameter should be defined based on the new threat. In still further embodiments, the interjector may detect that a new part or component has been added to the resource and should be tracked or assessed in the future (e.g., a vehicle is outfitted with new onboard sensors, has been outfitted with an attached trailer, has received a performance upgrade comprising new mechanical devices that the OBD may receive diagnostic information for, or the like)

In some embodiments, the interjectors may be stored as a separate application which monitors the assessment data within the distributed register and/or pull data from internal or external databases to detect the condition (e.g., a database of rules or policies, applications currently in use at an entity, or the like). In other embodiments, the interjectors may be executed as smart contracts. In embodiments in which the interjectors are executed as smart contracts, the interjectors may be configured to automatically trigger the addition of new assessment data upon the detection of a condition precedent (e.g., an updated rule or regulation, a new security threat, change in application ownership, or the like).

It should be noted that because assessment data is validated by the consensus algorithm before being added to the distributed register, the latest information within the data records of the distributed register may be considered to be valid until the interjector triggers the addition of data records to the distributed register. In other words, the distributed register may serve as the single source of truth for users within the entity system. In this way, the distributed register eliminates the occurrence of duplicative assessments and/or improperly performed assessments. Furthermore, the targeted nature of assessments triggered by interjectors (e.g., interjectors address specific areas that need to be updated) greatly increases the efficiency of the assessments performed on the applications in the entity system.

The process continues to block 404, where the system, based on detecting that the resource tracking data requires the update, trigger the resource tracking system to submit additional resource tracking data. In some embodiments, the additional resource tracking data may be entered manually by a user within the entity system. In such embodiments, triggering the resource tracking system may comprise automatically transmitting a notification to the resource tracking system, where the notification informs the user that the additional resource tracking data is required. In some embodiments, the notification may be a message sent via SMS, E-mail, instant messaging, or the like. In such embodiments, the notification may comprise a selectable object (e.g., a button, hyperlink, or the like) which, when selected by the user via the resource tracking system, activates an application on the resource tracking system (e.g., an entity-provided application, a third party program such as a web browser, or the like) which provides a graphical interface to the user. In other embodiments, the notification may be provided through a notification window within the graphical interface.

Through the graphical interface, the user may submit assessment data inputs for one or more assessment parameters for a given resource. In such embodiments, the graphical interface may display the various assessment parameters for each resource within the entity system. Each assessment parameter may be associated with an input field to receive assessment input data from the user, where the input field may be a clickable button, radio button, check box, text entry field, or the like. For instance, an assessment parameter may address whether the particular resource is in compliance with a certain internal entity policy. The user performing the assessment for the resource may, through the graphical interface, provide assessment input data (e.g., "yes" or "no") to the input field associated with said assessment parameter. In addition, the same graphical interface may be used to push alerts or reports to the user regarding identified patterns, events, or status updates regarding the resources, as further discussed in regard to FIG. 6.

The process continues to block 505, where the system receives, from the resource tracking system, a second proposed data record, the second proposed data record comprising the additional resource tracking data. The additional resource tracking data may, in some embodiments, be provided in response to the interjector's notification. For instance, the interjector may notify the user that a periodic maintenance (e.g., yearly, quarterly, monthly, daily, or the like) is due for a particular resource, where the periodic maintenance requires the additional resource tracking data (e.g., resource input data, new resource assessment parameters, or the like). In response, the user may log into the graphical interface to submit the additional resource tracking data to the nodes of the distributed register in the form of a second proposed data record.

The process continues to block 506, where the system validates, using the consensus algorithm, the second proposed data record based on the additional resource tracking data. As described above with reference to block 401, the system may use any number of different consensus algorithms to validate the second proposed data record. In particular, the additional resource tracking data may be verified to ensure that assessment input data references a valid assessment parameter, that assessment input data is in the acceptable from for a given assessment parameter, that the assessment data references a resource currently in use, or the like.

The process concludes at block 507, where the system appends the second proposed data record to a new entry in the distributed register. The new entry in the distributed register comprises the additional resource tracking data and is appended to the end of the distributed register. In this manner, resource tracking data may be added to the distributed register in increments on an "as-needed" basis as determined by the interjectors. Arranging the distributed register system in this way ensures that assessment data is verified and updated to provide the most accurate data across the longest time span as possible.

FIG. 6 is an additional process flow for the resource tracking system, in accordance with some embodiments of the present disclosure. Specifically, the process flow shown in FIG. 6 highlights the ability for the system to conduct analysis of the validated data on the distributed register in order to identify relevant patterns, statuses, potential impacts, and the like. As shown, the process begins at block 600, wherein the resource tracking system may access the validated data records of a distributed register to obtain resource assessment or tracking data for a given timeframe, group of resources, entity, operator, or the like. It is understood that the resource tracking system may access validated records based on any given parameter or metadata in order to retrieve relevant or desired data. For instance, a given entity may be alerted of a potential issue with one of its operators of a specific resource, and may wish to pull specific validated data related to the OBD readings of that resource to conduct further analysis. In other embodiments, the entity may submit a request for a pre-analyzed report of OBD reading data that the resource tracking system may process and compile for the entity. Such requests may be made using the graphical user interface of a user device as described with regard to FIG. 5.

As shown in block 601, the resource tracking system may analyze the validated data records to determine a resource assessment pattern or current status. The resource tracking system may then analyze the data in order to extrapolate additional information. For instance, assessment or tracking data received by the resource tracking systems 110 may be used to calculate an expected future resale value given an average mileage rate (e.g., miles driven per day, month, year, and the like) received from a particular resource, forecasting total mileage at given point in the future, and comparing the resource to other similar known resources currently for sale. This may be done by calculating a resource assessment vector or value impact vector. For instance, the system may determine that a particular resource odometer appears have an odometer reading that increases by 1000 miles per week, and may determine a vector (e.g., 1000/week) in order to extrapolate a forecasted total mileage some time in the future. Similarly, the system may use other known data in order to determine a value vector. For instance, the system may receive market data for the specific model, make, and year of a resource and analyze average selling price as correlated with mileage and condition of the resources. In this way, the system may determine the value impact vector according to price/age or selling price/mileage. In some cases the system may determine that a given value impact vector is not linear, such that the vector variable grows at an increasing rate as the resource wears or the odometer reading grows.

In other embodiments, the resource tracking system may receive assessment or tracking data indicating a particularly harsh driving style (e.g., a pattern of abrupt acceleration or braking as evidenced by accelerometer or speedometer readings correlating to a gravitational force (g-force) at a certain threshold, and the like), or a potentially problematic maintenance record (e.g., missed service appointments, missed inspection dates, and the like) that could also be used to factor into a "wear and tear" variable, which may also be recorded as a value impact vector used to adjust forecasted resale price or market value. For instance, the resource tracking system may receive and store maintenance requirements from various manufacturers that determines the threshold requirements for being "certified" pre-owned, and the like. If a particular resource were to miss a service appointment and lose eligibility for certification by a particular manufacturer, this may negatively affect the resale value. Alternatively, the resource tracking system may receive information that the resource has been damaged, which would affect the resource's resale value negatively.

In some embodiments, and as shown in block 603, the system may determine if a resource assessment pattern, resource status, or resource vector complies with a known policy or presents a potential issue, such as a material decrease in value (e.g., the resource is being driven over an allotted lease amount, the resource is no longer eligible or in danger of becoming ineligible for certified pre-owned status, the resource is behind its yearly inspection requirement, and the like). In these instances, the resource tracking system may issue an alert to the entity or owner responsible for the resource with a warning, reminder, or display a specific value, as shown in block 604.

In some embodiments, a forecasted condition may not be exact. For instance, the resource tracking system 110 may receive data indicating a harsh driving style, and an assumption may be made that the resource might incur a higher cost for maintenance or repairs in the future due to worn out mechanical components (e.g., based on the average lifespan of a given mechanical component, or as calculated by force, acceleration, and stress values as related to the material composition of a given component), or higher potential for a wreck occurring. Additionally, the resource tracking system 110 may extrapolate based on a harsh driving style that an operator of the resource likely has been harsh with regard to upkeep of the interior components of the resource.

In some embodiments, the user may receive further notification from an interjector through the graphical interface. For example, the user may receive a notification which states that a particular resource does not comply with a certain regulation or policy. In such embodiments, said user may be a developer, administrator, or maintainer of the resource. In this way, the concerned parties may have an efficient way to receive reliable information on the current state of the entity's resources.

Each communication interface described herein generally includes hardware, and, in some instances, software, that enables the computer system, to transport, send, receive, and/or otherwise communicate information to and/or from the communication interface of one or more other systems on the network. For example, the communication interface of the user input system may include a wireless transceiver, modem, server, electrical connection, and/or other electronic device that operatively connects the user input system to another system. The wireless transceiver may include a radio circuit to enable wireless transmission and reception of information.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EEPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Embodiments of the present invention are described above with reference to flowcharts and/or block diagrams. It will be understood that steps of the processes described herein may be performed in orders different than those illustrated in the flowcharts. In other words, the processes represented by the entries of a flowchart may, in some embodiments, be in performed in an order other that the order illustrated, may be combined or divided, or may be performed simultaneously. It will also be understood that the entries of the block diagrams illustrated, in some embodiments, merely conceptual delineations between systems and one or more of the systems illustrated by an entry in the block diagrams may be combined or share hardware and/or software with another one or more of the systems illustrated by an entry in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

INCORPORATION BY REFERENCE

To supplement the present disclosure, this application further incorporates entirely by reference the following commonly assigned patent applications:

| U.S. patent application Ser. No. | Title | Filed On |
| --- | --- | --- |
| 16/831,335 | SYSTEM FOR VALIDATED TRACKING OF EVENTS ASSOCIATED WITH EQUIPMENT DURING A RESOURCE ARRANGEMENT | Mar. 26, 2020 |
| 16/831,342 | SYSTEM FOR VALIDATED TRACKING AND MANAGEMENT OF EVENTS ASSOCIATED WITH EQUIPMENT DURING LIFETIME USAGE | Mar. 26, 2020 |
| 16/831,447 | SYSTEM FOR TRACKING A RESOURCE MAINTENANCE AND RESOURCE CAPABILITIES | Mar. 26, 2020 |
| 16/831,467 | SYSTEM FOR TRACKING A RESOURCE PERFORMANCE AND MAINTENANCE | Mar. 26, 2020 |

What is claimed is:

1. A system for managing resource tracking data in a distributed register, comprising:
    a processor;
    a communication interface; and
    a memory having a copy of the distributed register and executable code stored thereon, wherein the executable code, when executed by the processor, causes the processor to:
        receive resource tracking data from one or more entities or user devices;
        receive, from resource tracking system, a request to add a proposed data record to the distributed register, wherein the proposed data record comprises resource tracking data;
        validate, using a consensus algorithm, the proposed data record based on the resource tracking data;
        append the proposed data record to an entry in the distributed register;

receive additional resource tracking data for the multiple resources;
detect, via a distributed register interjector, that the resource tracking data requires an update based on review of previously validated data;
based on detecting that the resource tracking data requires the update, trigger the resource tracking system to submit resource tracking data;
receive, from the resource tracking system, a second proposed data record, the second proposed data record comprising the additional resource tracking data;
validate, using the consensus algorithm, the second proposed data record based on the additional resource tracking data; and
append the second proposed data record to a new entry in the distributed register.

2. The system of claim 1, wherein the additional resource tracking data is received in a continuous stream.

3. The system of claim 1, wherein the resource tracking data and additional resource tracking data comprises diagnostic data produced by an on board diagnostic device.

4. The system of claim 1, further configured to receive policies, guidelines, and procedures; and
analyze validated resource tracking data in order to determine if the resource tracking data indicates compliance with the policies guidelines, or procedures affecting one or more of the multiple resources.

5. The system of claim 1, further configured to analyze validated resource tracking information to determine a resource operation pattern for one or more of the multiple resources;
extrapolate a resource value impact vector based on the determined resource operation pattern;
determine a forecasted resource value for one or more timeframes based on the value impact vector; and
generate and display via the user device an alert comprising the forecasted resource value.

6. The system of claim 1 further comprising a periodic interjector, wherein the periodic interjector causes the processor to:
detect that a threshold amount of time has passed since resource tracking data has been received; and
trigger the resource tracking system to compile a report for validated data for one or more of the multiple resources.

7. The system of claim 1, wherein the distributed register interjector is a policy interjector, wherein the policy interjector causes the processor to:
detect a change in a policy affecting one or more of the multiples resources; and
trigger the resource tracking system to submit a third proposed data record, the third proposed data record comprising additional resource tracking data associated with the change in the policy.

8. A computer program product for managing resource tracking data in a distributed register, the computer program product comprising at least one non-transitory computer readable medium having computer-readable program code portions embodied therein, the computer-readable program code portions comprising:
an executable portion for receiving resource tracking data for multiple resources from one or more entities or user devices;
an executable portion for receiving, from resource tracking system, a request to add a proposed data record to the distributed register, wherein the proposed data record comprises resource tracking data;
an executable portion for validating, using a consensus algorithm, the proposed data record based on the resource tracking data;
an executable portion for appending the proposed data record to an entry in the distributed register;
an executable portion for receiving additional resource tracking data for the multiple resources;
an executable portion for detecting, via a distributed register interjector, that the resource tracking data requires an update based on review of previously validated data;
an executable portion for based on detecting that the resource tracking data requires the update, triggering the resource tracking system to submit resource tracking data;
an executable portion for receiving, from the resource tracking system, a second proposed data record, the second proposed data record comprising the additional resource tracking data;
an executable portion for validating, using the consensus algorithm, the second proposed data record based on the additional resource tracking data; and
an executable portion for appending the second proposed data record to a new entry in the distributed register.

9. The computer program product of claim 8, wherein the additional resource tracking data is received in a continuous stream.

10. The computer program product of claim 8, wherein the resource tracking data and additional resource tracking data comprises diagnostic data produced by an on board diagnostic device.

11. The computer program product of claim 8, further configured to receive policies, guidelines, and procedures; and
analyze validated resource tracking data in order to determine if the resource tracking data indicates compliance with the policies guidelines, or procedures affecting one or more of the multiple resources.

12. The computer program product of claim 8, further configured to cause the processor to:
detect that a threshold amount of time has passed since resource tracking data has been received; and
trigger the resource tracking system to compile a report for validated data for one or more of the multiple resources.

13. The computer program product of claim 8, wherein the distributed register interjector is a policy interjector, wherein the policy interjector causes the processor to:
detect a change in a policy affecting one or more of the multiples resources; and
trigger the resource tracking system to submit a third proposed data record, the third proposed data record comprising additional resource tracking data associated with the change in the policy.

14. A computer-implemented method for managing resource tracking data in a distributed register, the method comprising:
an executable portion for receiving resource tracking data for multiple resources from one or more entities or user devices;
receiving, from resource tracking system, a request to add a proposed data record to the distributed register, wherein the proposed data record comprises resource tracking data;

validating, using a consensus algorithm, the proposed data record based on the resource tracking data;

appending the proposed data record to an entry in the distributed register;

receive additional resource tracking data for the multiple resources;

detecting, via a distributed register interjector, that the resource tracking data requires an update based on review of previously validated data;

based on detecting that the resource tracking data requires the update, triggering the resource tracking system to submit resource tracking data;

receiving, from the resource tracking system, a second proposed data record, the second proposed data record comprising the additional resource tracking data;

validating, using the consensus algorithm, the second proposed data record based on the additional resource tracking data; and appending the second proposed data record to a new entry in the distributed register.

15. The computer-implemented method of claim 14, wherein the additional resource tracking data is received in a continuous stream.

16. The computer-implemented method of claim 14, wherein the resource tracking data and additional resource tracking data comprises diagnostic data produced by an on board diagnostic device.

17. The computer-implemented method of claim 14, further configured to receive policies, guidelines, and procedures; and analyze validated resource tracking data in order to determine if the resource tracking data indicates compliance with the policies guidelines, or procedures affecting one or more of the multiple resources.

18. The computer-implemented method of claim 14, further configured to analyze validated resource tracking information to determine a resource operation pattern for one or more of the multiple resources;

extrapolate a resource value impact vector based on the determined resource operation pattern;

determine a forecasted resource value for one or more timeframes based on the value impact vector; and generate and display via the user device an alert comprising the forecasted resource value.

19. The computer-implemented method of claim 14, further comprising a periodic interjector, wherein the periodic interjector causes the processor to:

detect that a threshold amount of time has passed since resource tracking data has been received; and trigger the resource tracking system to compile a report for validated data for one or more of the multiple resources.

20. The computer-implemented method of claim 14, wherein the distributed register interjector is a policy interjector, wherein the policy interjector causes the processor to:

detect a change in a policy affecting one or more of the multiples resources; and trigger the resource tracking system to submit a third proposed data record, the third proposed data record comprising additional resource tracking data associated with the change in the policy.

* * * * *